United States Patent Office 3,030,170  
Patented Apr. 17, 1962

---

3,030,170  
PROCESS FOR THE TREATMENT OF ANIMAL SKINS  
Erich Bäder, Hanau (Main), Otto Schweitzer, Konigstein (Taunus), and Ludwig-Karl Schwörzer, Konstanz, Germany, assignors to Deutsche Gold- und Silber-Scheideanstalt vormals Roessler, Frankfurt am Main, Germany  
No Drawing. Filed Mar. 23, 1959, Ser. No. 800,907  
Claims priority, application Germany Mar. 29, 1958  
14 Claims. (Cl. 8—94.18)

The present invention relates to an improved process for the treatment of animal skins, preferably dehaired hides or slaughter fresh non-dehaired animal skins, to produce leather-like products.

It is already known that animal skins can be dehydrated by treatment with methanol to produce a leather-like product. However, such product after having been stored in water for 24 hours will not dry to a leather-like product, but rather to a horn-like product.

It has also been suggested that monomeric polymerizable organic compounds be worked into animal skins in the absence of a polymerization catalyst or a plasticizer. However, only hard brittle products were obtained which had the properties of untreated dried hides or of the brittle synthetic resins.

It furthermore is known to incorporate monomeric polymerizable organic compounds, if desired together with copolymerizable polyesters, in animal skins and to polymerize them within the skin with the aid of catalysts, such as Redox systems, consisting of peroxides and tertiary amines. Preferably, Redox systems were used in which the reducing component is soluble in the monomer employed. The polymerization reaction in these processes proceeds very rapidly. However, considerable time is required to work the monomeric compounds into the hides and in order to obtain very high loadings it is usually necessary to repeat the operation.

According to the invention it was found that leather-like products could be produced from animal skins, preferably dehaired hides, by treating wet dehaired hides or slaughter fresh non-dehaired skins with a dispersion of an emulsifier in water. Upon drying, a white leather-like product is obtained which after 24 hours' storage in water will again dry as a leather-like product. Preferably, a non-ionic emulsifier or mixtures of such emulsifiers are employed. Often it is advantageous to employ a mixture containing non-ionic and ionic components.

Expediently, aqueous dispersions are employed which contain 0.5 to 25%, preferably 5 to 15%, by weight of the emulsifier.

Polyethoxylated nonyl phenol containing 7.7 to 8.5 ethoxy groups has been found especially advantageous as an emulsifier for the process according to the invention. Triton X-171, a blend of alkyl aryl polyether alcohols with organic sulfonates, has also been found particularly well suited. Also, mixtures of these two emulsifiers can be used with advantage. Polyethoxylated fatty acids or fatty alcohols, such as, for example, stearic acid, oleic acid or cetyl alcohol or polyethoxylated tributyl phenol in which the polyethoxy chain contains 3 to 16 ethoxy groups, are also well suited for the purposes of the invention. Commercially available emulsifiers, such as Emulphor O, Nekanil NL of BASF, which is a neutral reacting alkyl-aryl-polyglycol-ether, Germany, and Emulsifiers OTS and SLM of Chemische Werke Hüls, Marl, Germany, are also well suited.

The term "dehaired hide" (German=Blösse) as employed herein is intended to mean a clean animal skin according to the definition of F. Stather (Gerberei-Chemie und Gerberei- Technologie, page 210, 1957, 3rd ed.) as obtained after all operations in the beam-house are completed. It is of advantage for the process according to the invention to employ a dehaired hide which has been predehydrated with salt and partially dried. These can be treated by the process according to the invention after short soaking in water. The term "slaughter fresh skins" is employed herein to signify skins which have been stripped, freed of flesh residues, cleaned and, if desired, levelled. The skins and the dehaired hides can also be treated according to the invention in the pickled state.

It was furthermore found that the process according to the invention could be improved when the wet or lightly sammied dehaired hides or slaughter fresh skins are drummed in an aqueous dispersion of an emulsifier which also in addition contains at least one non-polymerizable water immiscible liquid organic compound, such as toluol, ethyl acetate, chlorinated hydrocarbons, such as chloroform, and carbon tetrachloride or mixtures thereof. Preferably, toluene is employed. These additional liquids can be employed in quantities up to 50% by weight, preferably 15 to 30% by weight, of the emulsion.

It was in addition found that known synthetic, vegetable, mineral and oil tanning agents can be worked into skins or hides which have been subjected to the above described process. The fact that the synthetic tanning agents can be insoluble in water is of special technical advantage. The synthetic tanning agents which customarily have been used are condensation products prepared from hydrocarbons, such as benzene, xylene, anthracene and the like, mono or polyhydric phenols, quinoid substances, nitro- and amino compounds and aldehydes or ketones. These condensation products all are more or less water insoluble substances which previously had to be converted into a water soluble form by sulfonation before their use as tanning agents. The sulfonic acid groups introduced, however, generally cause a reduction of the tanning action. These disadvantages are avoided according to the invention, as it is also possible to use such synthetic tanning agents which are water insoluble and contain no sulfo groups or only a few sulfo groups.

The treated hide can be dried before it is tanned. The tanning can also, however, be carried out with wet hides. It is also possible to pickle the hides by known procedures before they are tanned. It is not necessary to lime the hides before the tanning agents are worked in. If necessary, the hair may be removed with the aid of enzymes before tanning. The pickling, for example, can be carried out with an aqueous bath containing 10% of NaCl and 1% of concentrated formic acid. The tanning, for example, can be carried out with a chrome tanning solution containing 3% of $Cr_2O_3$.

The hides which have been treated according to the invention are soft, pliant and can, even without tanning, be stored without further conservation. However, known preservatives which do not attack the skins can also be used. As the skins are not salted, they are free of salt spots and their weight is not increased by adhering salt. They possess especially good physical properties, such as increased tensile strength.

It was also found that the skins and dehaired hides which have been subjected to the process according to the invention easily and quickly take up large quantities of further organic substances. Therefore, according to the preferred embodiment of the process according to the invention, it is possible to subject the treated hides to an aftertreatment with large quantities of polymerizable organic compounds. After the polymerizable compounds have been incorporated in the hides they can be polymerized with the aid of a catalyst. This aftertreatment is of technical interest, especially in the treatment of dehaired hides.

Examples of suitable polymerizable organic compounds are: vinyl compounds, such as vinyl acetate, vinyl toluene, styrene, acrylic acid and methacrylic acid or their esters, such as the methyl and ethyl esters or the higher esters, such as the dodecyl and butyl esters which at the same time act as internal plasticizers. Methyl methacrylate and styrene, especially mixtures thereof, are preferably employed. Allyl compounds can also be employed. Preferably, polymerizable compounds which contain only one aliphatic double carbon to carbon bond are employed.

Especial advantages can be attained when high molecular weight polyesters are also employed which can be copolymerized with the monomeric polymerizable compounds. Polyesters which are especially well suited are those of $\alpha$-$\beta$ unsaturated polycarboxylic acids, such as maleic or fumaric acid, or their derivatives, with polyhydric alcohols, such as glycerine, pentaerythritol, ethylene glycol and its homologues. Naturally, the degree of polymerization of the polyester must be such that it still can be taken up by leather. This requirement is usually met in usual commercial products. The composition of the mixtures can be varied in almost any desired limits. As a consequence, the time required for the polymerization, the quantity of polymer with which the leather is loaded and therefore the desired properties of the leather can be influenced within wide limits.

The known initiator systems can be employed for initiating the polymerization of the above described polymerizable substances or their mixtures. Preferably, Redox systems are employed which consist of a peroxidic oxidizing component and a reducing component, such as a tertiary amine, especially one which contains an aromatic radical, such as is the case in diisopropyl-p-toluidine, dimethyl aniline and the like and/or a sulfinic acid or their derivatives and/or sulfinic acid salts of organic bases, and/or teritary amines which have one or more groups of the following composition attached on the nitrogen atom:

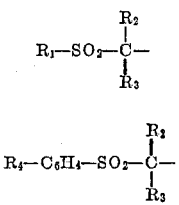

in which $R_1$ represents an aliphatic or aromatic radical and $R_2$, $R_3$, and $R_4$ represent hydrogen, or aliphatic or aromatic radicals. Other amines can also be employed with good effects, such as, for example, phenyl ethyl dibutyl amine or aromatic amines containing one or more hydroxyl groups in $\beta$ position with respect to the nitrogen atom or $\alpha$-amino-sulfones. Preferably, the reducing component of the Redox system is one which is soluble in the monomeric compound to be polymerized.

In many instances the velocity of the polymerization can be further increased by the addition of compounds containing an ionogenically bound halogen atom, such as, for example, hydrohalic acids, their salts or organic compounds containing a halogen atom which is not firmly bound, such as, for example, an addition compound of hydrochloric acid and an organic base. Monohydric and polyhydric alcohols act in a similar manner. Also, the addition of small quantities of heavy metals or their compounds, such as copper naphthenate, has a similar action.

Inorganic or organic peroxides can be employed as the oxidizing component of the Redox system, such as hydrogen peroxide, persulfates, acyl peroxides, chlorobenzoyl peroxides and the like.

In the aftertreatment with the polymerizable compounds it is expedient to drum the pretreated leather-like product after drying in an aqueous emulsion containing the polymerizable compounds and also either the oxidizing or reducing component of the Redox system. The other component is then worked in from an aqueous emulsion containing the other component of the Redox system. The polymerization ends after a few minutes. It is not necessary to employ raised temperatures. The drumming in of the polymerizable compound mixture, which, if desired, can contain other additions, such as leather grease, softeners, resins, synthetic resins, dyes, hydrophobic monomeric organic compounds and the like can also be effected in the absence of water. When the aftertreatment is carried out in the presence of water it is expedient to employ emulsifiers such as described above for the pretreatment. Preferably, polyethoxylated nonyl phenol or cetyl alcohol or mixtures thereof are used as the emulsifiers.

In the aftertreatment with the monomeric polymerizable compounds or their mixtures with unsaturated polyesters these materials may be present in the emulsion in quantities up to 250% by weight with reference to the hide treated.

The leathers produced according to the invention have a lowered absorption capacity for water, an increased resistance to shrinkage, an increased tensile strength and a higher loading with polymers. They are colorless and are soft even in the absence of a softener. They also will again dry to a leather-like product after 24 hours' soaking in water. By alteration of the ratios of the mixture polymerized therein it is possible to emphasize each of these properties individually. It is also possible by increasing the quantity of polyester added to produce a polymer containing leather which is completely odorless.

The following examples will serve to illustrate several embodiments of the process according to the invention.

*Example 1*

A slaughter-fresh goat skin was rinsed well with water. A piece weighing about 150 to 200 g. was drummed in a small Wacker drum for 2–3 hours with the addition of 300% of water, 5% of a polyethylene glycol ester of oleic acid containing 6 ethoxy groups and 30% of toluene. After the drumming operation the skin was centrifuged and dried to produce a soft leather-like product without further treatment.

This dried product can be tanned immediately or after longer periods of storage by known tanning processes, such as, for example, that described in Example 2.

*Example 2*

A slaughter-fresh goat skin was treated as in Example 1, except that after centrifuging it was immediately pickled in a 300% bath containing 10% of NaCl and 1% of concentrated formic acid. The pickled skin was then tanned for 2 to 2½ hours with a chrome tanning solution containing 3% $Cr_2O_3$. At the end of the tanning, 0.5 to 1% of soda was added to effect neutralization. The tanned skin was dried slowly.

Substantially the same results were obtained when the polyethylene glycol ester of oleic acid employed as the emulsifier was replaced by the polyethylene glycol ether of cetyl alcohol (8 ethoxy groups) or by polyethylene glycol ester of stearic acid (8 ethoxy groups).

The procedures of Examples 1 and 2 were repeated with slaughter-fresh calf skin with similarly good results.

The procedures of Examples 1 and 2 were also repeated using 10% of the emulsifier polyethylene glycol ester of stearic acid and using 20% of the emulsifier polyethylene glycol ester of oleic acid with excellent results.

The procedures of Examples 1 and 2 were also repeated using 2.5% of the emulsifier polyethylene glycol ester of stearic acid. An especially thorough tanning was obtained. The leather was soft after stuffing.

In comparison, when slaughter-fresh goat or calf skins were dried without pretreatment and then pickled in a 300% bath containing 10% of NaCl and 1% of concentrated formic acid and subsequently treated with a chrome tanning bath containing 3% of $Cr_2O_3$ for 2 to 2½ hours no satisfactory tanning effect could be obtained.

Example 3

A wet or lightly sammied dehaired hide was drummed for 3–6 hours at room temperature in a dispersion containing 15% of polyethylene glycol ether (25 ethoxy groups) of spermylalcohol (Emulphor O) and 85% of water. After stripping off the excess of the dispersion and drying, a white leather-like product was obtained which after 24 hours' soaking in water again dried to a leather-like product. The crude weight was 0.97 g./cc.

Example 4

The procedure of Example 3 was repeated, except that in this case the dispersion consisted of 10% by weight of the emulsifier, 25% by weight of ethyl acetate and 65% by weight of water. After drying, a white soft leather-like product also resisted 24 hours' soaking in water. The crude weight was 0.90 g./cc.

Example 5

The procedure of Example 3 was repeated using a dispersion consisting of 15% by weight of the emulsifier, 25% by weight of toluene and 60% by weight of water. The resultant leather-like product was similar to that of Example 4. The crude weight was 0.94 g./cc.

Example 6

A wet dehaired hide was drummed for 3–6 hours in a dispersion consisting of 15% by weight of the emulsifier used in Example 3, 25% by weight of monostyrene and 60% by weight of water. After stripping off the excess of the dispersion and drying, a white soft leather-like product was obtained which after 24 hours' soaking in water again dried to a leather-like product. The crude weight was 0.87 g./cc.

Example 7

The leather-like product of Example 5 was drummed for 2 to 4 hours in an emulsion of the following composition:

| | Percent by weight |
|---|---|
| Unsaturated polyester Palatal K 211/6 consisting of 75% of the polyester of maleic acid, phthalic acid and 1,3 proplene glycol in the proportion 2:1:3.1 and 25% of methyl methacrylate | 24 |
| Monomeric methyl methacrylate | 37.9 |
| Emulsifier as used in Example 3 | 10 |
| Water | 23.8 |
| Hardening paste (equal parts of benzoyl peroxide and dibutyl phthalate) | 4.3 |

The ratio of the leather-like product to the emulsion was about 1 part by weight:2 parts by weight.

After completion of the drumming the excess emulsion adhering to the surfaces of the leather was stripped off and subsequently the leather was drummed with an initiator emulsion of the following composition for 30 to 45 minutes:

| | Percent by weight |
|---|---|
| Dimethyl-p-toluidine | 0.5 |
| Emulsifier as used in Example 3 | 2 |
| Water | 97.5 |

The ratio of the leather-like product to emulsion in this instance was 1 part by weight:1 part by weight.

Thereafter the leather was lightly rinsed with water to remove the adherent substance and dried at room temperature.

A soft, white, odorless leather was obtained. After soaking in water for 24 hours it again dried to a leather-like product. The polymer loading of the product was 14.1% by weight, its crude weight was 1.08 g./cc. and its tensile strength was 590 kg./cm.$^2$.

Example 8

The leather-like product of Example 5 was drummed for 2–4 hours in an emulsion of the following composition:

| | Percent by weight |
|---|---|
| Monostyrene | 30.5 |
| Casting resin (Palatal P6 consisting of 2 parts of the polyester of maleic acid, phthalic acid and 1,3 propylene glycol in the proportion 2:1:3.1 and 1 part of monostyrene | 30.5 |
| Emulsifier as in Example 3 | 10 |
| Hardening paste as in Example 7 | 4.3 |
| Water | 24.7 |

2 parts by weight of the emulsion were used per part by weight of leather-like product. After completion of the drumming the excess emulsion adhering to the surface of the leather was stripped off and subsequently was drummed with an initiator emulsion, rinsed and dried as in Example 7. A soft, white leather was obtained which after 24 hours' soaking in water dried again to a leather-like product. Its loading with polymer was 4% by weight, its crude weight was 1.07 g./cc. and its tensile strength 650 kg./cm$^2$.

Example 9

The leather-like product of Example 5 was drummed for 2–4 hours in an emulsion of the following composition:

| | Percent by weight |
|---|---|
| Monostyrene | 42 |
| Casting resin as in Example 8 | 42 |
| Commercial 1:1 mixture of decyl and octyl methacrylate | 10 |
| Hardening paste as in Example 7 | 6 |

2 parts by weight of emulsion were used per part by weight of leather-like product. The drummed product was stripped of excess emulsion and subsequently drummed with an initiator emulsion, rinsed and dried as in Example 7.

A soft, white, odorless leather was obtained which after 2 hours' soaking in water took up 73.7% by weight of water and 84.5% by weight after 24 hours' soaking.

Example 10

The procedure of Examples 3, 4 or 5 was repeated and the leather-like product was drummed as described in Example 7 for 2 to 4 hours in an emulsion which contained 33% water and 66% of the following composition:

| | Parts by weight |
|---|---|
| Unsaturated polyester Palatal P6 | 50 |
| Monomeric styrene | 25 |
| Monomeric methyl methacrylate | 25 |
| Hardening paste of Example 7 | 6 |
| Emulsifier (equal parts of nonyl phenol, containing 8.5 ethoxy groups, and Emulphor O) | 0.5 |

4 parts by weight of the emulsion were used per part by wt. of leather-like product. The initator emulsion had the following composition:

0.5% by wt. dimethyl-p-toluidine
0.5% by wt. of the above mentioned emulsifier
99% by wt. water A soft, white, odorless leather was obtained, and 3% by wt. of polymerized compounds were incorporated.

Example 11

The procedure of Example 10 was repeated, except that the emulsion had the following composition:

| | Parts by weight |
|---|---|
| Unsaturated polyester Palatal P6 | 50 |
| Monomeric methyl methacrylate | 30 |
| Monomeric butyl methacrylate | 20 |
| Hardening paste of Example 10 | 6 |
| Emulsifier of Example 10 | 0.5 |

The leather contained 9% by wt. of the polymerized compounds and was very soft and white.

*Example 12*

Cow grain (grain splits) was treated for 3 to 5 hours as in Example 1 with an emulsion which contained 10% by wt. emulsifier (80% nonyl phenol with 8.5 ethoxy groups and 20% emulsifier SLM or OTS), 20% by wt. toluene and 70% water. The ratio of the leather to the emulsion was about 1 part by wt. : 2 parts by wt. After the treatment the product was rinsed for 30 minutes with water. A white, soft leather-like product was obtained.

We claim:

1. A process for the treatment of an animal skin material selected from the group consisting of slaughter fresh non-dehaired skins and wet dehaired hides which comprises drumming such animal skin material in a dispersion of non-ionic emulsifier in water, impregnating the drummed skin material with at least one polymerizable organic monomer containing a $>C=CH_2$ group and subjecting the impregnated hide to an aftertreatment with a polymerization catalyst.

2. The process of claim 1 in which said dispersion also contains an ionic emulsifier.

3. The process of claim 1 in which said dispersion contains 0.5 to 25% by weight of emulsifier.

4. The process of claim 1 in which said dispersion contains 5 to 15% by weight of emulsifier.

5. The process of claim 1 in which said dispersion also contains a non-polymerizable water immiscible liquid organic compound.

6. The process of claim 1 in which said dispersion also contains toluene.

7. The process of claim 1 in which said dispersion contains up to 50% of a non-polymerizable water immiscible organic liquid compound.

8. The process of claim 1 in which said dispersion contains 15 to 30% by weight of a non-polymerizable water immiscible organic liquid compound.

9. The process of claim 1 in which said catalyst is a catalytic Redox system.

10. The process of claim 9 in which said Redox system consists of a peroxidic compound and a tertiary amine.

11. The process of claim 9 in which the reducing component of the Redox system is soluble in the polymerizable organic monomer.

12. The process of claim 1 in which the drummed hide is impregnated with an aqueous emulsion of said polymerizable organic monomer containing a non-ionic emulsifier.

13. The process of claim 12 in which said emulsion contains up to 250% by weight of polymerizable substance based upon the weight of the dehaired hide.

14. A process for the treatment of an animal skin material selected from the group consisting of slaughter fresh non-dehaired skins and wet dehaired hides which comprises drumming such animal skin material in a dispersion of non-ionic emulsifier in water, impregnating the drummed skin material with at least one polymerizable organic monomer containing a $>C=CH_2$ group and at least one unsaturated polyester of an $\alpha$-$\beta$-unsaturated polycarboxylic acid with a polyhydric alcohol copolymerizable with said monomer and subjecting the impregnated hide to an aftertreatment with a polymerization catalyst.

References Cited in the file of this patent

UNITED STATES PATENTS

| | | |
|---|---|---|
| 1,949,990 | Brodersen | Mar. 6, 1934 |
| 1,961,740 | Conquest | June 5, 1934 |
| 2,113,799 | Muller | Apr. 12, 1938 |
| 2,158,627 | Kritchevsky | May 16, 1939 |
| 2,923,595 | Heyden et al. | Feb. 2, 1960 |

FOREIGN PATENTS

| | | |
|---|---|---|
| 586,540 | Great Britain | Mar. 21, 1947 |
| 720,505 | Great Britain | Dec. 22, 1954 |

OTHER REFERENCES

O'Flaherty: "Technology of Leather," Rheinhold Publishing Corp., New York, 1956, pp. 470 and 471, vol. 1.